(12) United States Patent
Sanders et al.

(10) Patent No.: US 12,443,360 B1
(45) Date of Patent: Oct. 14, 2025

(54) COPYING OF DATA IN A STORAGE SYSTEM BETWEEN STORAGE DRIVES THAT HAVE EMBEDDED COMPRESSION

(71) Applicant: INTERNATIONAL BUSINESS MACHINES CORPORATION, Armonk, NY (US)

(72) Inventors: Lee Jason Sanders, Chichester (GB); Florent Christian Rostagni, Eastleigh (GB); Paul Nicholas Cashman, Burnham-on-Sea (GB); Roderick Guy Charles Moore, Bournemouth (GB); Mark Keith Elliott, Hampshire (GB); Gareth John Nicholls, Brockenhurst (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/817,531

(22) Filed: Aug. 28, 2024

(30) Foreign Application Priority Data

Jul. 30, 2024 (GB) ..................................... 2411155

(51) Int. Cl.
*G06F 3/06* (2006.01)

(52) U.S. Cl.
CPC ............ *G06F 3/065* (2013.01); *G06F 3/0604* (2013.01); *G06F 3/0683* (2013.01)

(58) Field of Classification Search
CPC ....... G06F 3/0604; G06F 3/065; G06F 3/0683
USPC ......................................................... 711/154
See application file for complete search history.

(56) References Cited

U.S. PATENT DOCUMENTS

| 8,019,940 | B2 | 9/2011 | Flynn et al. |
| 9,838,045 | B1 | 12/2017 | Bennett |
| 10,049,008 | B2 | 8/2018 | Grube et al. |
| 10,466,925 | B1 * | 11/2019 | Blanco .................... G06F 3/067 |
| 10,474,441 | B1 * | 11/2019 | Denisenko ............... G06F 8/41 |
| 10,761,929 | B2 | 9/2020 | Bolkhovitin et al. |
| 10,827,039 | B1 * | 11/2020 | Dandekar ............... H04L 69/04 |
| 10,990,480 | B1 | 4/2021 | Bernat et al. |
| 11,163,652 | B2 | 11/2021 | Park et al. |
| 11,281,601 | B2 | 3/2022 | Subbarao et al. |

(Continued)

FOREIGN PATENT DOCUMENTS

CN       111480148 A       7/2020

OTHER PUBLICATIONS

Intellectual Property Office, "Patents Act 1977: Search Report under Section 17(5)", Dec. 13, 2024, 3 Pages, GB Application No. 2411155.1.

*Primary Examiner* — Than Nguyen
(74) *Attorney, Agent, or Firm* — Kimberly Zillig

(57) ABSTRACT

A method, computer program product, and computer system for copying of data in a storage system between storage drives that have embedded compression. The method includes determining that a copy operation of data is required from a source drive to a target drive and determining that the source drive and the target drive use the same compression algorithm. The method includes: reading the data in a compressed form from the source drive including bypassing a decompression algorithm; transmitting the compressed data from the source drive to the target drive; and receiving and writing the compressed data at the target drive including bypassing a compression algorithm at the target drive.

20 Claims, 6 Drawing Sheets

(56) References Cited

U.S. PATENT DOCUMENTS

| | | | |
|---|---|---|---|
| 11,645,153 B2 | 5/2023 | Shivanand et al. | |
| 2007/0073941 A1* | 3/2007 | Brink | G06F 3/0677 710/68 |
| 2012/0260009 A1* | 10/2012 | Lu | G06F 3/0679 710/52 |
| 2014/0359219 A1* | 12/2014 | Evans | G06F 12/023 711/118 |
| 2017/0286215 A1* | 10/2017 | Gerhard | G06F 3/0689 |
| 2020/0249869 A1 | 8/2020 | Glimcher et al. | |
| 2021/0117123 A1 | 4/2021 | Jakowski et al. | |
| 2023/0418685 A1 | 12/2023 | Kinsey et al. | |
| 2024/0419744 A1* | 12/2024 | Koseki | G06F 16/951 |

* cited by examiner

COPYING OF DATA IN A STORAGE SYSTEM BETWEEN STORAGE DRIVES THAT HAVE EMBEDDED COMPRESSION

BACKGROUND

The present disclosure relates to computer storage systems.

When a large capacity drive is replaced in an array, it can take many hours for the copy back of data to that new drive to complete and restore the full drive redundancy for the array. In the meantime, the array has less redundancy, which increases the risk of it going offline due to too many concurrent drive failures. Anything which speeds up the copy back is welcome.

Drives in a storage array, such as a redundant array of independent disks (RAID) often contain a built-in compression function that automatically compresses the data that is written to the drives.

Normally for copy operations, where the data is copied from one drive to another (such as an array copyback, an Xcopy operation, or other copy operations related to replication), the drive needs to decompress the data before sending it to the storage controller, and the storage controller then needs to re-write the data to the target drive at which the data then needs recompressing.

SUMMARY

According to an aspect of the present disclosure there is provided a computer implemented method for copying of data in a storage system between storage drives that have embedded compression, comprising: providing a compressed data transfer interface in the storage drives; determining that a copy operation of data is required from a source drive to a target drive wherein the source drive and the target drive use the same compression algorithm; reading the data in a compressed form from the source drive including bypassing a decompression algorithm; transmitting the compressed data from the source drive to the target drive; and receiving and writing the compressed data at the target drive including bypassing a compression algorithm at the target drive.

According to another aspect of the present disclosure there is provided a system for copying of data in a storage system between storage drives that have embedded compression, comprising: a processor and a memory configured to provide computer program instructions to the processor to execute a method of: providing a compressed data transfer interface in the storage drives; determining that a copy operation of data is required from a source drive to a target drive wherein the source drive and the target drive use the same compression algorithm; reading the data in a compressed form from the source drive including bypassing a decompression algorithm; transmitting the compressed data from the source drive to the target drive; and receiving and writing the compressed data at the target drive including bypassing a compression algorithm at the target drive.

According to a further aspect of the present disclosure there is provided a computer program product for copying of data in a storage system between storage drives that have embedded compression, the computer program product comprising a computer readable storage medium having program instructions embodied therewith, the program instructions executable by a processor to cause the processor to: provide a compressed data transfer interface in the storage drives; determine that a copy operation of data is required from a source drive to a target drive wherein the source drive and the target drive use the same compression algorithm; read the data in a compressed form from the source drive including bypassing a decompression algorithm; transmit the compressed data from the source drive to the target drive; and receive and write the compressed data at the target drive including bypassing a compression algorithm at the target drive.

Figure 1:
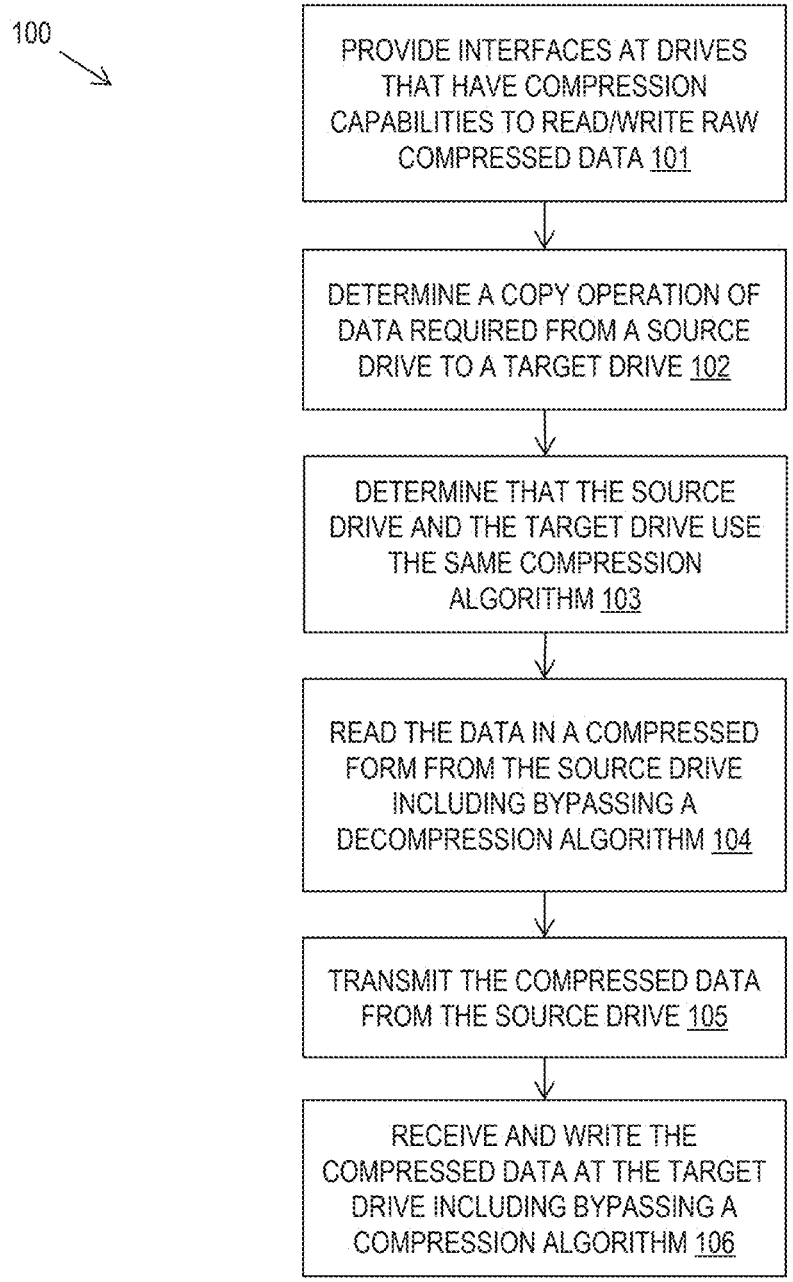
FIG. 1 is a flow diagram of a method, in accordance with embodiments of the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for copying of data in a storage system between storage drives that have embedded compression. Computational storage is a technique where storage drives have additional compute capabilities associated with them that is used for compression operations. The presence of compute capabilities on the storage drives allows for operations against the data which would previously be non-viable for a storage drive and would require a storage controller to perform. Storage drives are storage devices that read and write data. Storage drives may include but are not limited to solid-state drives (SSD), hard disk drives (HDD), flash storage drives, etc. Storage drives that have embedded compression include computational capabilities that provide a compression and decompression layer through which reads and writes of data at the drive pass.

According to an aspect of the present disclosure there is provided a computer implemented method for copying of data in a storage system between storage drives that have embedded compression, comprising: providing a compressed data transfer interface in the storage drives; determining that a copy operation of data is required from a source drive to a target drive wherein the source drive and the target drive use the same compression algorithm; reading the data in a compressed form from the source drive including bypassing a decompression algorithm; transmitting the compressed data from the source drive to the target drive;

and receiving and writing the compressed data at the target drive including bypassing a compression algorithm at the target drive.

The method has the advantage that the data being moved is in its compressed form. This reduces an amount of buffer space needed in memory and an amount of time it takes to transfer this data over any bus or network.

Providing a compressed data transfer interface may include a protocol having a read raw data command to read data in the compressed form from a source drive thereby bypassing the decompression algorithm at the source drive.

Providing a compressed data transfer interface may include a protocol having a write raw data command to write data in the compressed form to a target drive thereby bypassing the compression algorithm at the target drive.

According to another aspect of the present disclosure there is provided a system for copying of data in a storage system between storage drives that have embedded compression, comprising: a processor and a memory configured to provide computer program instructions to the processor to execute a method of: providing a compressed data transfer interface in the storage drives; determining that a copy operation of data is required from a source drive to a target drive wherein the source drive and the target drive use the same compression algorithm; reading the data in a compressed form from the source drive including bypassing a decompression algorithm; transmitting the compressed data from the source drive to the target drive; and receiving and writing the compressed data at the target drive including bypassing a compression algorithm at the target drive.

According to a further aspect of the present disclosure there is provided a computer program product for copying of data in a storage system between storage drives that have embedded compression, the computer program product comprising a computer readable storage medium having program instructions embodied therewith, the program instructions executable by a processor to cause the processor to: provide a compressed data transfer interface in the storage drives; determine that a copy operation of data is required from a source drive to a target drive wherein the source drive and the target drive use the same compression algorithm; read the data in a compressed form from the source drive including bypassing a decompression algorithm; transmit the compressed data from the source drive to the target drive; and receive and write the compressed data at the target drive including bypassing a compression algorithm at the target drive.

The computer readable storage medium may be a non-transitory computer readable storage medium and the computer readable program code may be executable by a processing circuit.

The present disclosure seeks to provide one or more concepts. Such concepts may be computer-implemented. That is, such methods may be implemented in a computer infrastructure having computer executable code tangibly embodied on a computer readable storage medium having programming instructions configured to perform a proposed method. The present disclosure further seeks to provide a computer program product including computer program code for implementing the proposed concepts when executed on a processor.

A target drive may be a storage drive to which data is being written from another storage drive referred to as a source drive. The target drive may be a replacement drive to which data is copied back or another form of drive that receives copied data from one or more source drives.

The described method and system provide operations to read and write raw compressed data between storage drives bypassing the compression layer at the storage drives. Using the described method and system, when a target drive has the same compression algorithm as a source drive, reading and writing of data is carried out by reading raw compressed data from the source drive without decompressing the data and writing the raw compressed data to the target drive without compressing the data (as it is already compressed). The term "raw compressed data" is used to refer to data in a compressed form.

The bypassing of decompression and recompression steps when copying data is an improvement in the technical field of computer storage, backup, and redundancy. It has the advantage of reducing resource and processing overheads in a storage system.

Referring to FIG. 1, a flow diagram 100 shows an example embodiment of the described computer implemented method for copying of data in a storage system between storage drives that use compression.

The described method, at operation 101, provides an interface at each drive to be able to read and write the raw compressed data without the drives needing to decompress and recompress the data. When the drives operate with the same compression algorithm, the raw compressed is read from one drive and written to another drive.

Providing a compressed data transfer interface includes a protocol having a "read raw data" command to read data in the compressed form from a source drive thereby bypassing the decompression algorithm at the source drive and having a "write raw data" command to write data in the compressed form to a target drive thereby bypassing the compression algorithm at the target drive. The protocol may be any protocol that has existing read/write interface.

The method, at operation 102, determines that a copy operation of data is required from a source drive to a target drive. The method, at operation of 103, determines that the source drive and the target drive use the same compression algorithm.

The method, at operation 104, reads the data in a compressed form from the source drive using the read raw data command bypassing a decompression algorithm in a decompressing layer at the source drive.

The method, at operation 105, transmits the compressed data from the source drive to the target drive. This step may be applied using different implementations as described further below.

The method, at operation 106, receives and writes the compressed data at the target drive using the write raw data command bypassing a compression algorithm at the target drive.

The conventional protocol for a drive is to have a "read" command or "write" command issued to it: "read" to retrieve data, "write" to store data. In the described method, there are two additional commands provided in the protocol to "read raw data" to read the data without decompression of the data and to "write raw data" to store the data on the drive in the received compressed form.

Embodiments of these commands may be provided in any protocol that has a read/write interface. For example, such protocols may include Small Computer System Interface (SCSI) or nonvolatile memory express (NVMe) protocols.

The described method and system may be used for a copy operation that involves reading data and copying the data to another location with the data being copied in a compressed form. This may include a copy operation within a same drive, a copy operation to an independent drive in an array of a same storage controller, or a copy operation to an independent drive in an array of a remote independent storage controller. As long as the target of the copy operation can manage the inbound raw compressed data, it is possible to send the raw compressed data.

In a first embodiment, the transmitting of the compressed data from the source drive to the target drive transmits the compressed data to the target drive directly without transfer to a storage controller or to an initiator. This is referred to as peer-to-peer transfer.

Figure 2:
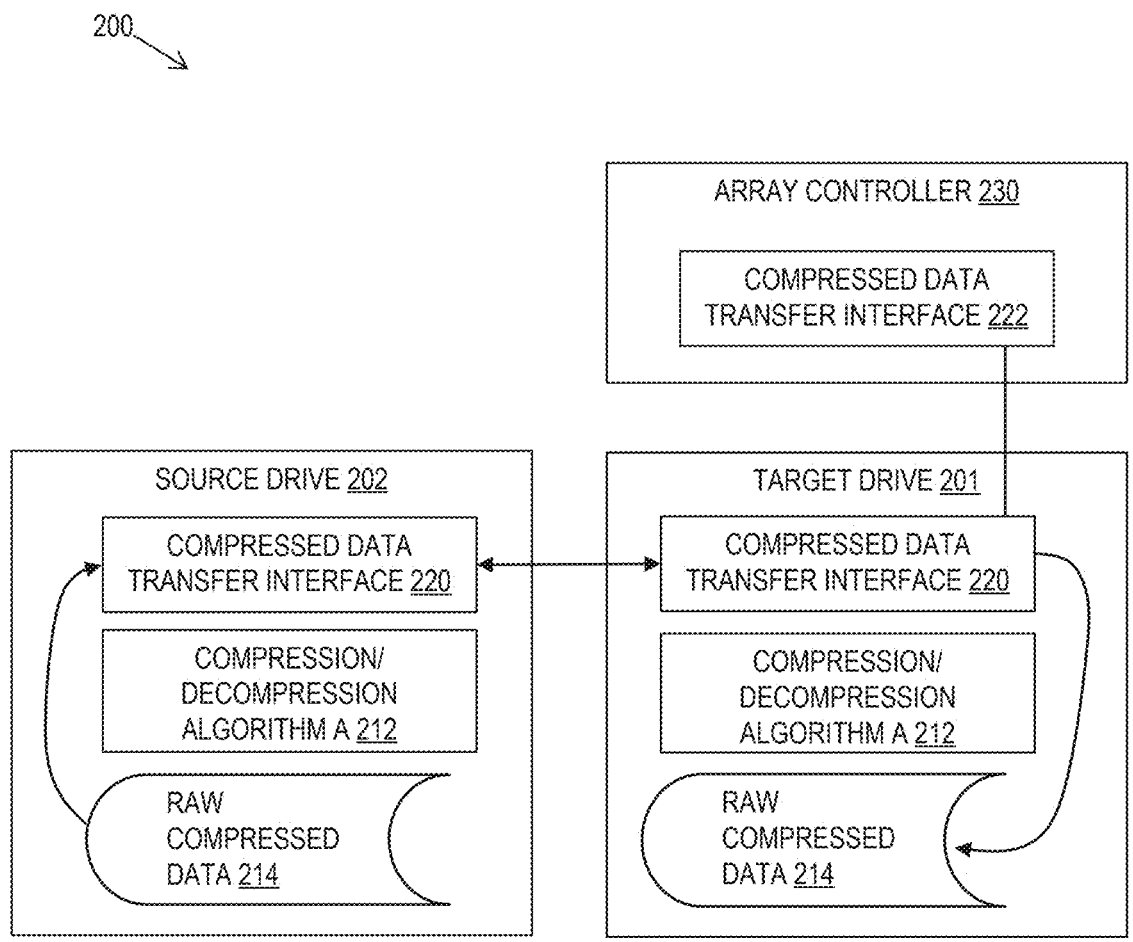
FIG. 2 is a schematic diagram of a method and system with direct drive to drive transmitting of compressed data, in accordance with embodiments of the present disclosure.

An example system for implementing the first embodiment is shown in the schematic diagram 200 of FIG. 2. In this embodiment, a target drive 201 and a source drive 202 both have the same compression/decompression algorithm A 212 and they are both capable of using drive peer-to-peer transfers. A compressed data transfer interface 220 is provided at each drive 201, 202 and facilitates the transfer of the raw compressed data 214 from the source drive 202 to the target drive 201 bypassing the compression/decompression algorithm A 212 at each drive.

The target drive 201 and the source drive 202 may be drives in an array having an array controller 230. The array controller 230 may provide the target drive 201 with information to obtain the compressed data from other drives as source drives 202 in the array. The target drive 201 may then request compressed blocks of the compressed data from the other drives 202.

The array controller 230 may give the target drive 201 a sequence of existing drives and the associated geometry (for example, RAID geometry in the case of a RAID controller) in order to enable the target drive 201 to request the copy data from the source drives 202 in the array. In this case, the array controller 230 keeps track of the copy process to manage the overall copy process. The array controller 230 includes a corresponding compressed data transfer interface 222 for coordinating with the compressed data transfer interfaces 220 of the drives 201, 202 to bypass the compression/decompression algorithm A 212.

Peer-to-peer direct memory access (DMA) is a method of transferring data without the involvement of a processor. A peripheral component interconnect (PCI) device can request control of the bus and request to read from and write to another drive.

In the case of a RAID, the RAID controller of the array may give the target drive the information required to get the necessary data from each of the source drives in the array. This allows the target drive to request the raw compressed blocks without a need for decompression and recompression by the drive or read/write operations by the RAID controller.

Alternatively, RAID controller may govern each individual copy back sending one copy operation at a time and the drives do the copy peer-to-peer. The copy process between peer drives is then only sending/receiving the compressed data.

In a second embodiment, the transmitting of the compressed data from the source drive to the target drive transmits the compressed data to a storage controller for forwarding to the target drive.

Where the use of drive peer-to-peer transfers is not applicable, a storage controller may read raw compressed data from a source member drive and write raw compressed data to the target drive. This reduces data transfer on the bus, removes decompress/compress overheads on the drives, and uses less overall resources in the storage controller as the compressed data requires less buffers.

In this embodiment of a copy operation, if the drives do not support peer-to-peer transfers, or the data needing to be transferred is across two PCI domains then the storage controller may be more involved in the copy operation and issue read/writes. The storage controller can request the raw compressed data be transferred, which it can then write directly to the target drive's memory without needing to recompress it. This reduces the overall amount of data transferred on the bus and thus increases the overall copy back performance and does so with less resource use on the storage controller.

Figure 3:
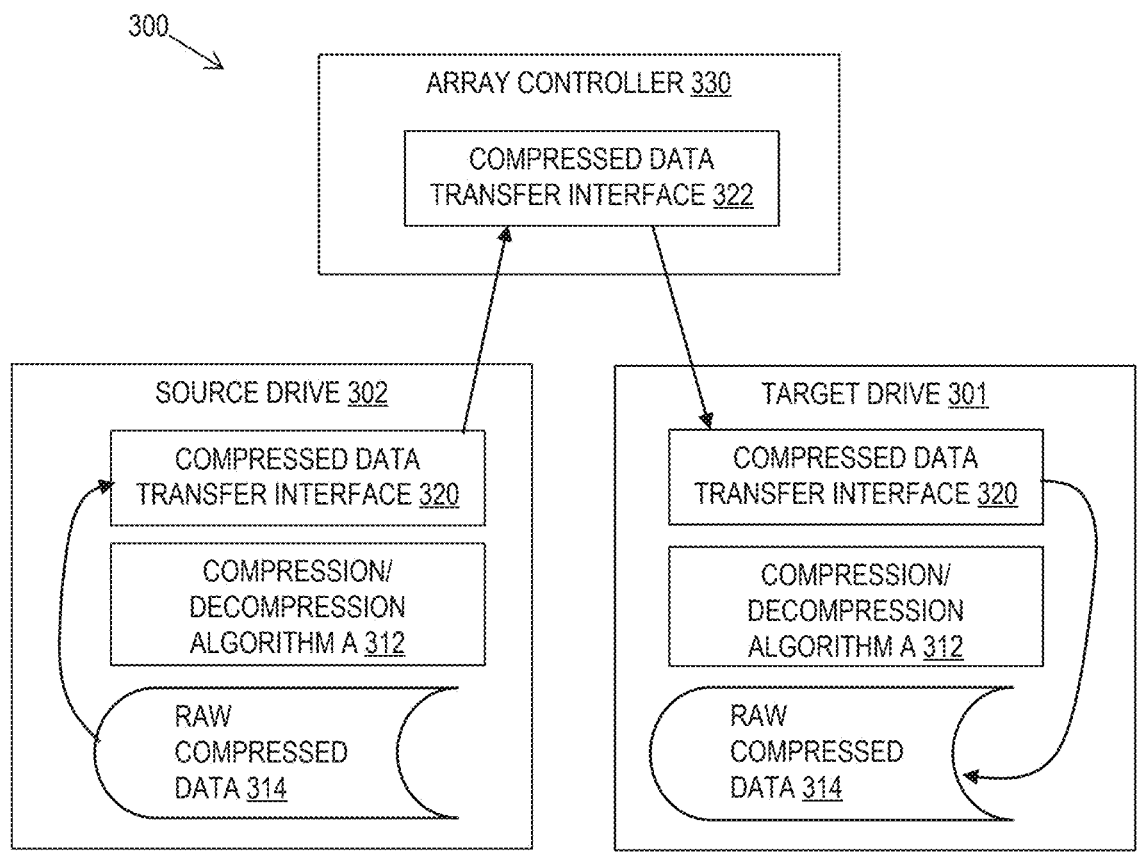
FIG. 3 is a schematic diagram of a method and system with transmitting of compressed data via a storage controller, in accordance with embodiments of the present disclosure.

An example system for implementing the second embodiment is shown in the schematic diagram 300 of FIG. 3. In this embodiment, a target drive 301 and a source drive 302 both have the same compression/decompression algorithm A 312 but they are not capable of using drive peer-to-peer transfers.

A compressed data transfer interface 320 is provided at each drive 301, 302 and facilitates the transfer of the raw compressed data 314 from the source drive 302 to the target drive 301 bypassing the compression/decompression algorithm A 312 at each drive.

The target drive 301 and the source drive 302 may be drives in an array having an array controller 330. The array controller 330 may coordinate a sequence of copy operations from existing drives in order to enable the target drive 301 to obtain the copy data from the source drive 302 in the array. The array controller 330 keeps track of the copy process to manage the overall copy process. The array controller 330 includes a corresponding compressed data transfer interface 322 for coordinating with the compressed data transfer interfaces 320 of the drives 301, 302 to bypass the compression/decompression algorithm A 312.

In a third embodiment, the transmitting of the compressed data from the source drive to the target drive transmits the compressed data to an initiator for forwarding to the target drive via a source array controller and the target array controller.

This is the case where there is a remote copy or Xcopy operation is in place. The source controller reads the raw compressed data from the source drive in compressed form and sends this to a remote storage controller which then writes this data directly to its local target drives as raw compressed data. This means that neither controller needs to do any decompression/recompression of the data.

Figure 4:
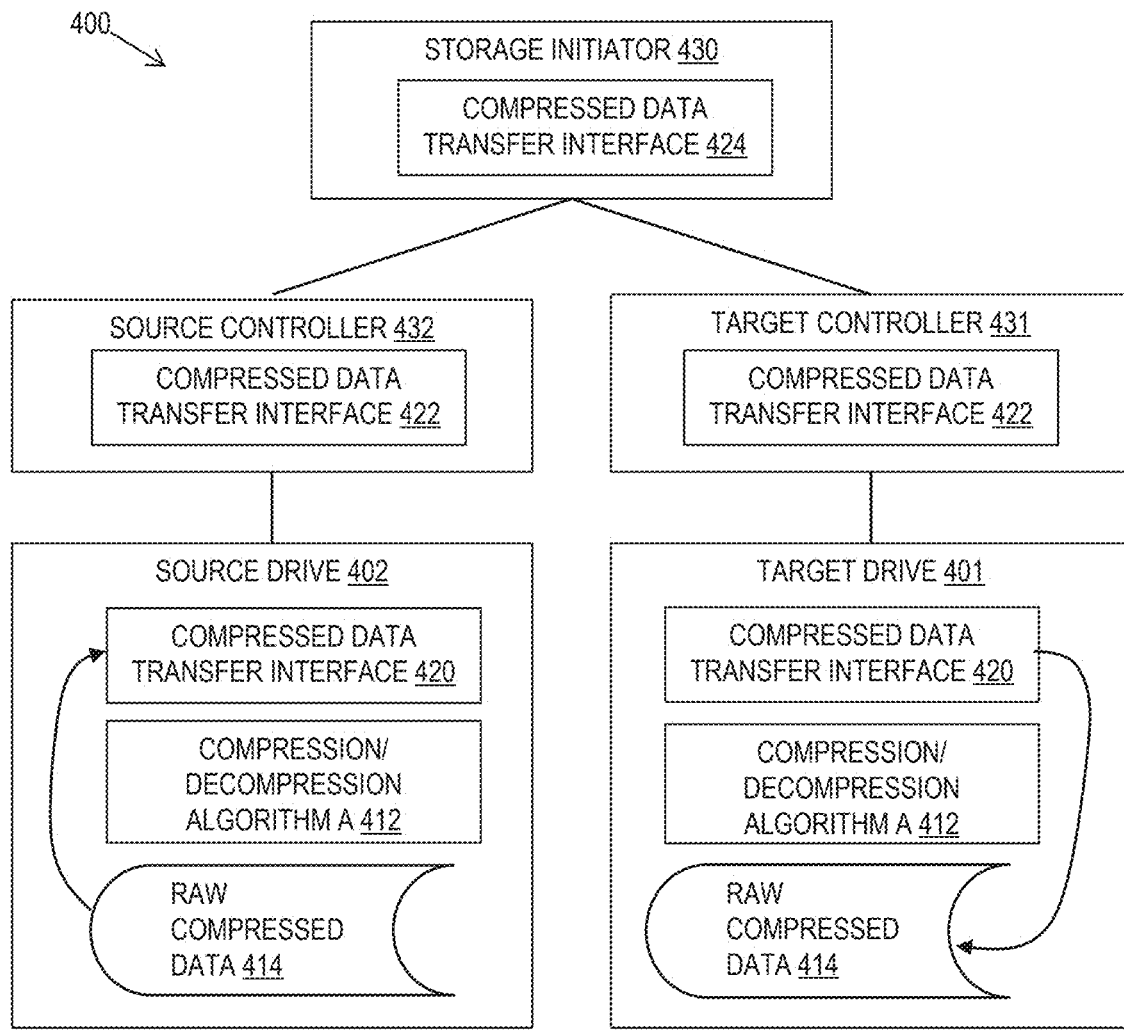
FIG. 4 is a schematic diagram of a method and system with transmitting of compressed data via an initiator, in accordance with embodiments of the present disclosure.

An example system for implementing the third embodiment is shown in the schematic diagram 400 of FIG. 4. In this embodiment, a target drive 401 and a source drive 402 both have the same compression/decompression algorithm A 412 but they are not capable of using drive peer-to-peer transfers and they do not share the same array controller.

A compressed data transfer interface 420 is provided at each drive 401, 402 and facilitates the transfer of raw compressed data 414 from the source drive 402 to the target drive 401 bypassing the compression/decompression algorithm A 412 at each drive.

The target drive 401 and the source drive 402 may be drives in separate arrays each having an array controller 431, 432. A storage initiator 430 at a host may coordinate, via the array controllers 431, 432, a sequence of copy operations from existing drives in order to enable the target drive 401 to obtain the copy data from the source drive 402. The initiator 430 keeps track of the copy process to manage the overall copy process. The initiator 430 and the array controllers 431, 432 may include corresponding compressed data transfer interfaces 424, 422 for coordinating with the compressed data transfer interfaces 420 of the drives 401, 402 to bypass the compression/decompression algorithm A 412.

As the data being moved is in its compressed form, the amount of buffer space needed in memory is reduced and the amount of time it takes to transfer this data over any bus/network (Peripheral Component Interface/Fibre Channel/Ethernet etc.) is reduced.

Conventionally for a copy operation where the data is copied from one drive to another, the drive needs to decompress the data before sending it to the storage controller, and the storage controller then needs to re-write the data to the target drive where the data then needs recompressing. In the described method and system, the drive does not need to decompress the data before sending the data to the destination drive or to the storage controller. This reduces bandwidth consumption within the system and saves compression and decompression bandwidth within the drive, in the bus or network interface, and in the communication protocol. This also saves bandwidth between the drive and the storage controller, or between other storage controllers giving large savings depending on the compressibility of the data.

Very large flash drives usually have a field-programmable gate array (FPGA), possibly with an embedded processor core, that can do storage work much faster than a processor in a server or by the RAID controller of the array.

A copy operation of data to a target drive from one or more source drives may be involved in one of the group of: drive to drive copy, site to site replication, point in time copy, volume mirroring, multiple file copying across directories or networks, array drive rebuild or copyback, array transformation, and array expansion.

When a source and target logical block address of the copy are on the same drive, the drive may copy the compressed data from one address to another within the drive without needing to decompress/recompress it or sending it to and from the controller.

In one example, the described method and system may be used for copyback in a RAID, or in other situations in which data is copied between computational drives. The computational drives may be, for example, high performance flash drives. The described method and system may utilize a RAID controller to coordinate reading of raw compressed data from a source member drive and writing it to a target drive to mitigate data decompression/compression overheads on high-performance flash drives.

Using the described method, the target drives can do most of the copyback work whilst allowing the drives to send/receive the compressed raw data that exists on the RAID copy back region. This prevents the drives from having to decompress the data, send it on the bus and then recompress the data on the target drive reducing drive overheads and bus utilization.

The RAID controller's memory required for the copyback may be reduced significantly. A further advantage is that a faster copyback time allows a storage array to be fully redundant faster.

The processor utilization in RAID may be significantly reduced by offloading the pack geometry to each drive having embedded compression. The drive may use the pack geometry to work out which logical block addressing (LBA) to read from where the other drives have embedded compression in order to write locally. The RAID controller would only have to download the pack geometry once per pack and wait until completion before having to do any more processing or I/O. The RAID controller may keep a bitmap of packs that have been completed which may be filled in on completion. If a disaster occurs where the processing of a pack is not completed, then the bitmap would record that the pack was not finished so on recovery it would be redriven.

Figure 5:
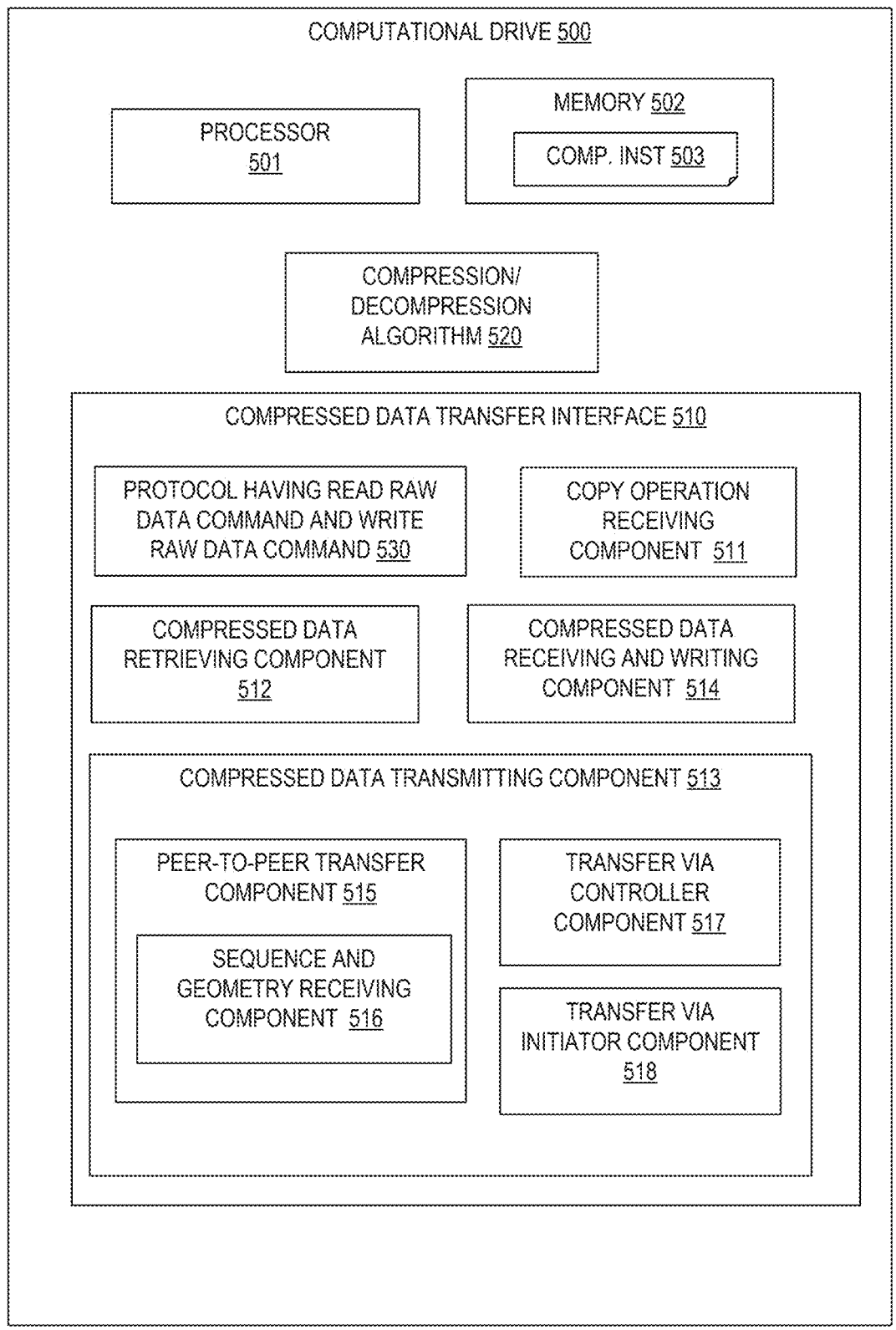
FIG. 5 is a block diagram of a system, in accordance with embodiments of the present disclosure.

Referring to FIG. 5, a block diagram shows a computational drive 500 including at least one processor 501, a hardware module, or a circuit for executing the functions of the described components which may be software units executing on the at least one processor. Memory 502 may be configured to provide computer instructions 503 to the at least one processor 501 to carry out the functionality of the components.

The computational drive 500 includes a compression/decompression algorithm 520. The computational drive 500 includes a compressed data transfer interface 510 for providing the described functionality in the storage drives. The compressed data transfer interface 510 includes a protocol 530 having a read raw data command to read data in the compressed form from a source drive thereby bypassing the decompression algorithm at the source drive and a write raw data command to write data in the compressed form to a target drive thereby bypassing the compression algorithm at the target drive.

The compressed data transfer interface 510 includes a copy operation receiving component 511 for determining that a copy operation of data is required from a source drive to a target drive wherein the source drive and the target drive use the same compression algorithm.

The compressed data transfer interface 510 includes a compressed data reading component 512 reading the data in a compressed form when the drive 500 is a source drive including bypassing a decompression algorithm.

The compressed data transfer interface 510 includes a compressed data transmitting component 513 for transmitting compressed data when the drive 500 is a source drive for transmitting to a target drive.

The compressed data transfer interface 510 includes a compressed data receiving and writing component 514 for receiving and writing the compressed data when the drive 500 is a target drive including bypassing a compression algorithm at the target drive.

The compressed data transmitting component 513 may include a peer-to-peer transfer component 515 for transmitting the compressed data from a source drive to a target drive directly without transfer to a storage controller or to an initiator. The peer-to-peer transfer component 515 include a sequence and geometry receiving component 516 for receiving from a storage controller a sequence of source drives and associated geometry to the target drive for reading data from multiple source drives for the copy operation.

The compressed data transmitting component 513 may include a transfer via controller component 517 for transmitting the compressed data from a source drive to a target drive via a storage controller for forwarding to the target drive.

The compressed data transmitting component 513 may include a transfer via initiator component 518 for transmitting the compressed data from a source drive to a target drive using an initiator via a source storage controller for forwarding to a target storage controller of a target drive.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
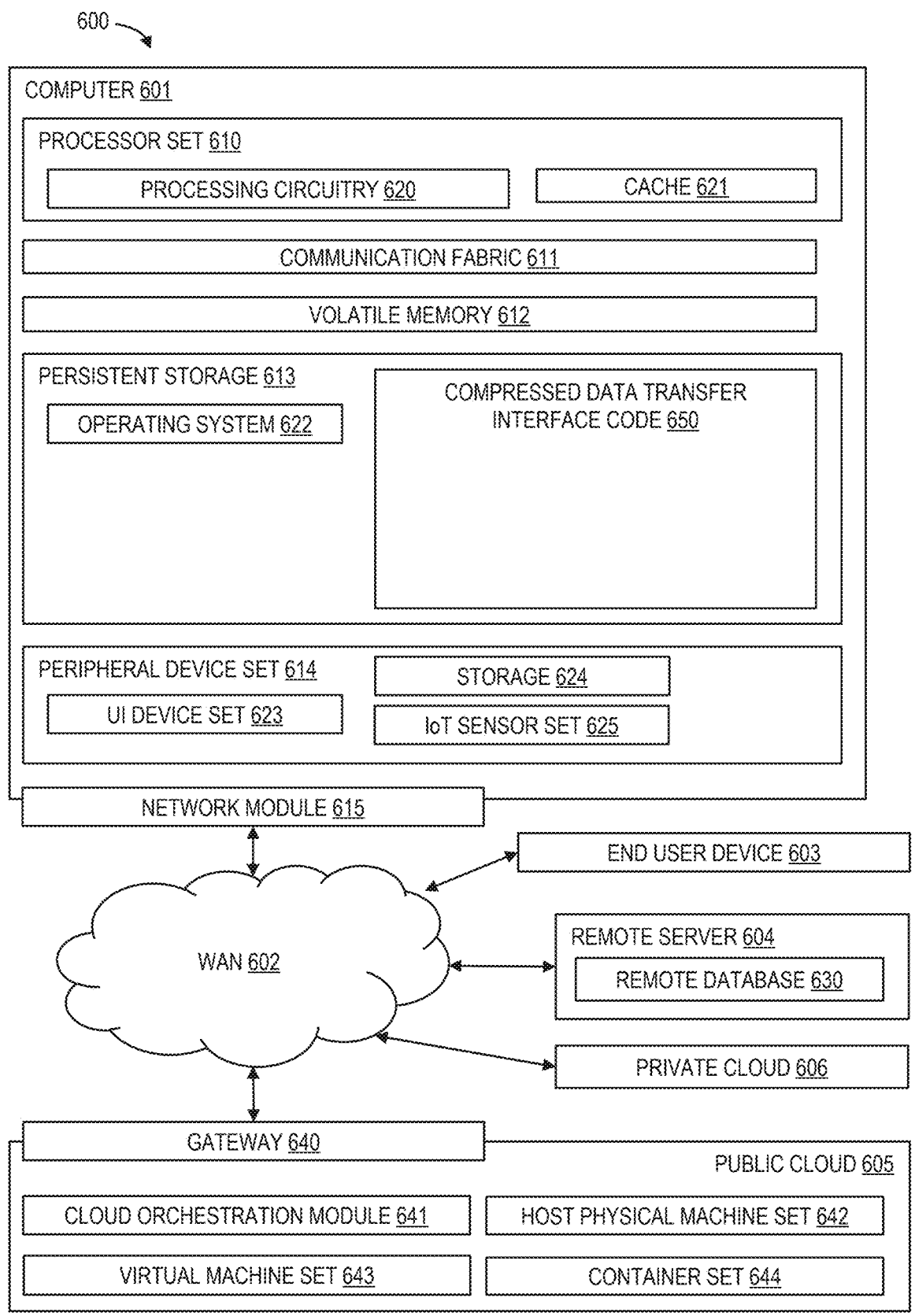
FIG. 6 is a block diagram of a computing environment for the execution of at least some of the computer code involved in performing the present disclosure, in accordance with embodiments of the present disclosure.

Referring to FIG. 6, computing environment 600 contains an example of an environment for the execution of at least some of the computer code involved in performing the inventive methods, such as compressed data transfer interface code 650. In addition to the compressed data transfer interface code 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and the compressed data transfer interface code 650, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

Computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

Processor set 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in the compressed data transfer interface code 650 in persistent storage 613.

Communication fabric 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

Persistent storage 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid-state storage devices. Operating system 622 may take several forms, such as various known proprietary operating systems or open-source Portable Operating System Interface-type operating systems that employ a kernel. The code included in the compressed data transfer interface code 650 typically includes at least some of the computer code involved in performing the inventive methods.

Peripheral device set 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

Network module 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 603 is any computer system that is used and controlled by an end user (for example, a customer of an enterprise that operates computer 601) and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

Remote server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present disclosure.

What is claimed is:

1. A computer implemented method for copying of data in a storage system between storage drives that have embedded compression, comprising:
   providing a compressed data transfer interface in the storage drives;
   determining that a copy operation of data is required from a source drive to a target drive wherein the source drive and the target drive use a same compression algorithm;
   reading compressed data from the source drive including bypassing a decompression algorithm;
   transmitting the compressed data from the source drive to the target drive; and
   receiving and writing the compressed data at the target drive including bypassing the compression algorithm at the target drive.

2. The method of claim 1, wherein providing the compressed data transfer interface includes a protocol having a read raw data command to read data in the compressed form from the source drive thereby bypassing the decompression algorithm at the source drive.

3. The method of claim 1, wherein providing the compressed data transfer interface includes a protocol having a write raw data command to write data in the compressed form to the target drive thereby bypassing the compression algorithm at the target drive.

4. The method of claim 1, wherein transmitting the compressed data from the source drive to the target drive transmits the compressed data to the target drive directly without transfer to a storage controller or to an initiator.

5. The method of claim 4, further comprising:
   receiving from the storage controller a sequence of source drives and associated geometry at the target drive for reading data from multiple source drives for the copy operation.

6. The method of claim 5, further comprising:
   keeping track of the copy operation by the storage controller.

7. The method of claim 4, wherein the storage controller governs each individual copy back sending one copy operation at a time and the source drive carries out a copy peer-to-peer to the target drive with the compressed data.

8. The method of claim 1, wherein transmitting the compressed data from the source drive to the target drive transmits the compressed data to a storage controller for forwarding to the target drive.

9. The method of claim 1, wherein transmitting the compressed data from the source drive to the target drive transmits the compressed data to an initiator via a source storage controller for forwarding to a target storage controller of a target drive.

10. The method of claim 1, wherein the copy operation involves reading data and copying the data to another drive, wherein the data is copied in a compressed form in one of the following: within a same drive, to an independent drive in an array of a same storage controller, to an independent drive in an array of a remote independent storage controller.

11. The method of claim 1, wherein the copy operation is involved in one of a group of: drive to drive copy, site to site replication, point in time copy, volume mirroring, multiple file copying across directories or networks, offload storage data transfer, array drive rebuild or copyback, array transformation, and array expansion.

12. A computer system for copying of data in a storage system between storage drives that have embedded compression, the computer system comprising:
   one or more processors, one or more computer-readable memories and one or more computer-readable storage media;
   program instructions, stored on at least one of the one or more storage media for execution by at least one of the one or more processors via at least one of the one or more memories, to provide a compressed data transfer interface in the storage drives;
   program instructions, stored on at least one of the one or more storage media for execution by at least one of the one or more processors via at least one of the one or more memories, to determine that a copy operation of data is required from a source drive to a target drive wherein the source drive and the target drive use a same compression algorithm;
   program instructions, stored on at least one of the one or more storage media for execution by at least one of the one or more processors via at least one of the one or more memories, to read compressed data from the source drive including bypassing a decompression algorithm;
   program instructions, stored on at least one of the one or more storage media for execution by at least one of the one or more processors via at least one of the one or more memories, to transmit the compressed data from the source drive to the target drive; and program instructions, stored on at least one of the one or more storage media for execution by at least one of the one or more processors via at least one of the one or more memories, to receive and write the compressed data at the target drive including bypassing the compression algorithm at the target drive.

13. The computer system of claim 12, wherein the program instructions to transmit the compressed data from the source drive to the target drive transmits the compressed data to the target drive directly without transfer to a storage controller or to an initiator.

14. The computer system of claim 13, wherein the storage controller is configured to provide a sequence of source drives and associated geometry to the target drive for reading data from multiple source drives for the copy operation.

15. The computer system of claim 14, wherein the storage controller maintains track of the copy operation by the storage controller.

16. The computer system of claim 12, further comprising:
a storage controller configured to govern each individual copy back sending one copy operation at a time and the source drives carry out copy peer-to-peer of the compressed data.

17. The computer system of claim 12, wherein the program instructions to transmit the compressed data from the source drive to the target drive transmits the compressed data to a storage controller for forwarding to the target drive.

18. The computer system of claim 12, wherein the program instructions to transmit the compressed data from the source drive to the target drive transmits the compressed data to an initiator via a source storage controller for forwarding to a target storage controller of a target drive.

19. The computer system of claim 12, wherein the computer system is implemented in a storage system including one or more redundant array of independent disks (RAID) each with a storage controller and an array of physical drives having embedded compression.

20. A computer program product for copying of data in a storage system between storage drives that have embedded compression, the computer program product comprising:
one or more computer-readable storage media;
program instructions, stored on at least one of the one or more storage media, to provide a compressed data transfer interface in the storage drives;
program instructions, stored on at least one of the one or more storage media, to determine that a copy operation of data is required from a source drive to a target drive wherein the source drive and the target drive use a same compression algorithm;
program instructions, stored on at least one of the one or more storage media, to read compressed data from the source drive including bypassing a decompression algorithm;
program instructions, stored on at least one of the one or more storage media, to transmit the compressed data from the source drive to the target drive; and
program instructions, stored on at least one of the one or more storage media, to receive and write the compressed data at the target drive including bypassing the compression algorithm at the target drive.

\* \* \* \* \*